Sept. 16, 1958 P. V. ROBERTS 2,852,223
ANTI-VIBRATION MOUNT
Filed Sept. 29, 1955
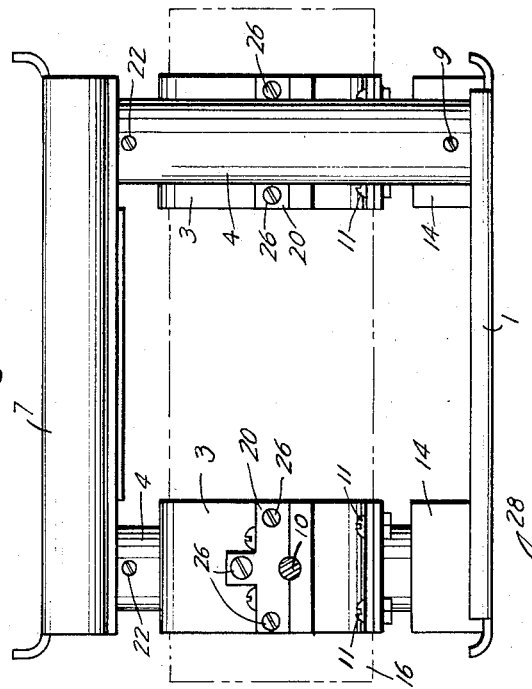
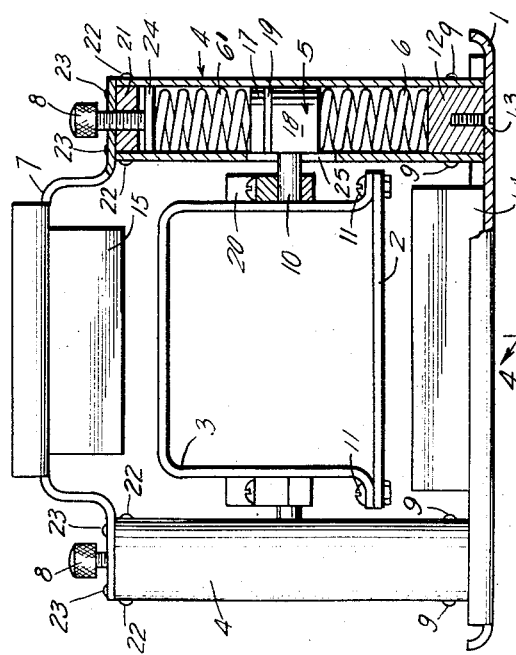
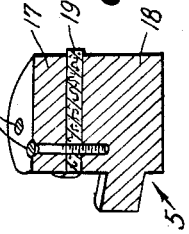
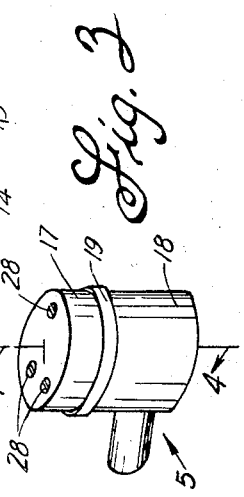
INVENTOR.
PAUL V. ROBERTS
BY

United States Patent Office 2,852,223
Patented Sept. 16, 1958

2,852,223

ANTI-VIBRATION MOUNT

Paul V. Roberts, Lexington, Mass., assignor, by mesne assignments, to the United States of America as represented by the Secretary of the Navy Application September 29, 1955, Serial No. 537,607

4 Claims. (Cl. 248—358)

This invention relates to anti-vibration mounts adapted for use on electrical apparatus. More specifically the invention relates to a mount which has not only general application for all types of electronic equipment but also has special adaptability on electronic equipment intended to be mounted in small, non-accessible places which are subject to constant vibration. Because of this feature the particular mount is not only efficient but is of such a design as to be assembled into a small compact unit.

An object of this invention, therefore, is a novel anti-vibration mount of general utility.

A further object of this invention is anti-vibration mount compact in design for installation on equipment on non-accessible places which are subject to constant vibration.

A still further object of this invention is an anti-vibration mount, the dampening characteristics of which are readily adjustable.

Other objects and advantages will be understood from the following description and accompanying drawings wherein:

Fig. 1 is an elevation view of the mount partially cut away together with the environmental structure;

Fig. 2 is a plan view of Fig. 1;

Fig. 3 is a detail view of a piston assembly of the anti-vibration mount; and

Fig. 4 is a section taken along the line 4—4 of Fig. 3.

The use of electronic equipment on moving bases or supports, as for example aircraft, is restricted somewhat due to inaccuracies produced in the equipment from vibrations of the base. As an illustration, location of the electronic equipment in wing tips, detachable pods or in empennage extremities is bound to produce vibration of the equipment.

The device to dampen these vibrations consists of a pair of upper bracket assemblies 3 mounted to the anti-vibration mechanism. A bracket base 2 is attached to each of the upper bracket assemblies, by means of screws 11. Between the two brackets is mounted the electronic equipment 16, which equipment is fastened to the brackets in any conventional manner.

On either side of each assembly are mounted a pair of cylinders 4, 4 on a base plate 1. Thus, there are four cylinders in the complete mount. Located in each cylinder is a piston assembly 5; on the opposite sides of which abut springs 6, 6'. On their opposite ends, the springs in turn are limited by the post 12 and an adjustment means (to be discussed hereinafter) carried by the cylinder cover 21. The cover is fastened to the cylinder via conventional screws 22. Post 12 is anchored to the base plate by screw 13 and is secured to the cylinder 4 by means of screws 9. The post 12 not only serves as an abutment for the spring but also is a guide post for the cylinder assemblies.

Turned into cover plate 21 are screw means 23, which screws anchor the cover plate or top cover 7 for the entire assembly.

Each plate 21 also carries an adjusting screw 8 which has fastened on one extremity thereof a disc 24. The disc bears against the upper spring and can be adjusted to vary the compression of the spring.

Each piston assembly 5 against which the springs 6, 6' abut is comprised of an upper piston member 17 and a lower piston member 18, which piston members sandwich or carry therebetween a compressible friction means 19, the friction means in this instance being comprised of a disc of resilient and pliable material such as leather. Three machine screws 28, the heads of which are countersunk into upper piston member 17, are threaded into lower piston member 18. These screws adjust the initial compression of and minimum damping provided by friction means or disc 19 and prevent any possible separation of the piston sections. Extending from the cylinder wall of the lower piston member 18 of the piston assembly 5 is a stud 10. The latter element is supported by support means 20 fastened to the bracket assembly 3 by screws 26. The stud rides in a slot 25 cut into the wall of the cylinder 4.

Mounted below and above the bracket structure 2, 3 on base plate 1 and top cover 7, respectively, are foam rubber cushions 14, 15.

Operation

As aforesaid, the electronic device 16 is mounted in the pair of bracket assemblies 3, 3 while the frame structure is mounted to the base 1, as for example, an airplane. Any vibrations occurring are damped out by the spring and piston assemblies within each cylinder. The springs of course are initially compressed depending upon the amount of dampening action desired. In the event of vibrations of large amplitude, rubber means 14 and 15 serve to limit the movement of the electronic device and also to dampen such movement.

The dampening action of the mount can be adjusted by turning the screw means 8 in or out of the cylinder 4. If, for example, the screw were to be turned for additional inward movement, spring 6' would be initially compressed. However, the additional compression would at the same time adjust itself to the second spring 6 also, so that the additional added compression would be shared by both springs. With the turning of the screw, not only are the screw means further compressed but the friction disc 19 is also readjusted. The friction means 19 is flattened out or compressed and the periphery thereof comes into more intimate contact or greater frictional engagement with the inner cylinder wall. As a result, the action, up or down, of the entire piston unit is dampened or made more "sluggish."

When the screw 8 is reversely adjusted, the compression of the friction disc 19 and the springs is of course opposite to that described above and the device tends to be less "sluggish."

Obviously many modifications and variations of the present invention are possible in the light of the above teachings. It is therefore to be understood that within the scope of the appended claims the invention may be practiced otherwise than as specifically described.

What is claimed is:

1. An anti-vibration mount for a shock sensitive article or the like comprising a base member, two pairs of spaced and opposed post members carried by said base member and extending therefrom at substantially right angles, a hollow cylinder mounted on each corner of said base member with one of said post members being received in the bore of each of said hollow cylinders at one of the ends thereof, each of said hollow cylinders having an elongated aperture therein intermediate the ends thereof, cover means carried by each of said hollow cylinders at the opposite end thereof, a lower piston member slidably received in the bore of each of said hollow cylinders and being movable therein in opposite directions, a stud carried by each of said lower piston members for movement therewith and being received in said elongated apertures in said hollow cylinders for movement therein in opposite directions, an upper piston member slidably received in the bore of each of said hollow cylinders and being movable therein in opposite directions, a friction disc of compressible material slidably received in the bore of each of said hollow cylinders and being positioned between the opposing faces of said piston members therein, screw means rigidly connecting said piston members and said friction disc in each of said hollow cylinders for slidable unit movement and being adjustable to vary the compression of each of said friction discs to thereby vary the diameter thereof, resilient means in the bore of each of said hollow cylinders acting in compression and in opposite directions on said upper and lower piston members and thereby being operable to resiliently support said piston members and said friction disc in the bore of each of said hollow cylinders for movement in opposite directions, bracket means operatively connected to said lower piston member studs for movement therewith and being operable to carry said shock sensitive article, and adjustment means carried by each of said cover means on said hollow cylinders for varying the compression of said resilient means in each of said hollow cylinders to thereby vary the resistance of said resilient means to movement of said piston members in opposite directions when a vibration load is applied thereto by said shock-sensitive article, said friction disc in each of said hollow cylinders being frictionally engageable with the wall surface of the bore thereof and thereby being operable to dampen the movement of said piston members in opposite directions.

2. An anti-vibration mount as claimed in claim 1 wherein said resilient means in each of said hollow cylinders is comprised of a pair of compression springs, one of said compression springs having one end seated on one face of said lower piston member and the opposite end seated on said post member received in the bore of each of said hollow cylinders, the other of said compression springs having one end seated on one face of said upper piston member and the opposite end seated on said adjustment means carried by said cover means on each of said hollow cylinders.

3. An anti-vibration mount as claimed in claim 1 further including a cover plate carried by said cover means on said hollow cylinders, said cover plate extending substantially parallel to said base member and being attached to said cover means by screws.

4. An anti-vibration mount as claimed in claim 3 wherein said base member and said cover plate carry rubber cushions, said cushions being opposed and facing each other and being operable to limit the movement in opposite directions of said bracket means and the shock sensitive article carried thereby when the vibratory movement of said shock-sensitive article in opposite directions exceeds a predetermined amplitude.

References Cited in the file of this patent

UNITED STATES PATENTS

| | | |
|---|---|---|
| 1,087,519 | White | Feb. 17, 1914 |
| 1,502,866 | Moore | July 29, 1924 |
| 1,802,589 | Thompson | Apr. 28, 1931 |
| 2,312,718 | Kouyounjian | Mar. 2, 1943 |
| 2,683,576 | Miller | July 13, 1954 |